United States Patent
Viola et al.

(10) Patent No.: US 7,426,825 B2
(45) Date of Patent: Sep. 23, 2008

(54) METHOD AND APPARATUS FOR UREA INJECTION IN AN EXHAUST AFTERTREATMENT SYSTEM

(75) Inventors: Michael B. Viola, Macomb Township, MI (US); David B. Brown, Brighton, MI (US); Michael J. Paratore, Howell, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/459,737

(22) Filed: Jul. 25, 2006

(65) Prior Publication Data
US 2008/0022659 A1    Jan. 31, 2008

(51) Int. Cl.
*F01N 3/00* (2006.01)

(52) U.S. Cl. .............. 60/286; 60/274; 60/276; 60/301; 60/303

(58) Field of Classification Search ............ 60/274, 60/276, 286, 295, 301, 303
See application file for complete search history.

(56) References Cited

U.S. PATENT DOCUMENTS

| | | | | |
|---|---|---|---|---|
| 5,540,047 | A * | 7/1996 | Dahlheim et al. ........... 60/274 |
| 5,845,487 | A * | 12/1998 | Fraenkle et al. ............ 60/274 |
| 6,082,102 | A * | 7/2000 | Wissler et al. ............. 60/286 |
| 6,119,448 | A * | 9/2000 | Emmerling et al. ......... 60/274 |
| 6,305,160 | B1 * | 10/2001 | Hammerle et al. .......... 60/286 |
| 6,427,439 | B1 * | 8/2002 | Xu et al. .................... 60/286 |
| 6,532,736 | B2 | 3/2003 | Hammerle et al. |
| 6,662,553 | B2 | 12/2003 | Patchett et al. |
| 6,742,326 | B2 | 6/2004 | Xu et al. |
| 6,755,014 | B2 | 6/2004 | Kawai et al. |
| 6,761,025 | B1 * | 7/2004 | Gladden .................... 60/286 |
| 6,871,489 | B2 * | 3/2005 | Tumati et al. .............. 60/285 |
| 6,941,746 | B2 * | 9/2005 | Tarabulski et al. .......... 60/286 |
| 6,959,540 | B2 | 11/2005 | Itoh et al. |
| 7,065,958 | B2 | 6/2006 | Funk et al. |
| 7,178,328 | B2 | 2/2007 | Solbrig |
| 2003/0033799 | A1 * | 2/2003 | Scheying ................... 60/286 |
| 2004/0040284 | A1 | 3/2004 | Upadhyay et al. |
| 2004/0074229 | A1 | 4/2004 | Upadhyay et al. |
| 2007/0044456 | A1 * | 3/2007 | Upadhyay et al. ........... 60/295 |

* cited by examiner

Primary Examiner—Thomas Denion
Assistant Examiner—Diem Tran

(57) ABSTRACT

An exhaust aftertreatment system and control system is provided, including a urea injecting device, a selective catalyst reduction device, and, a sensing device operative to monitor a forward portion of the selective catalyst reduction device. The sensing device can comprise a NOx sensor, and alternatively, an ammonia sensor. A control module adapted to monitor signal inputs from the engine, the NOx sensing system, the temperature sensing system, and the sensing device operative to monitor a forward portion of the selective catalyst reduction device; and, adapted to control operation of the urea injecting device.

11 Claims, 4 Drawing Sheets

METHOD AND APPARATUS FOR UREA INJECTION IN AN EXHAUST AFTERTREATMENT SYSTEM

TECHNICAL FIELD

This invention pertains generally to exhaust aftertreatment systems for internal combustion engines.

BACKGROUND OF THE INVENTION

Manufacturers of internal combustion engines are continually developing new engine control strategies to satisfy customer demands and meet various regulations. One such engine control strategy comprises operating an engine at an air/fuel ratio that is lean of stoichiometry to improve fuel economy and reduce greenhouse gas emissions. Such engines include both compression-ignition (diesel) and lean-burn spark-ignition engines. When an engine operates in a region lean of air/fuel stoichiometry, a resultant typically includes increased combustion temperatures, leading to increased NOx emissions.

One proposed type exhaust aftertreatment system and control strategy for managing and reducing NOx emissions includes injection of urea into an exhaust gas feedstream upstream of a selective catalytic reduction ('SCR') catalytic device to cause a reduction of NOx exhaust gases to nitrogen and oxygen, among other gases.

Effective control of rate of injection of urea is required to reduce engine-out NOx emissions. A urea injection rate preferably matches an engine-out NOx emissions rate for optimum NOx reduction. Typical urea injection control systems currently in use are not capable of controlling urea injection at very low flow rates, which typically occur at engine idle conditions and when a vehicle is decelerating, i.e. conditions when the engine is producing very low engine-out NOx emissions. A typical urea-SCR catalyst has a capacity to store ammonia, which comprises urea which has decomposed on the catalyst surface. The catalyst is able to continue NOx reduction when the urea injection control system is not capable of controlled dosing, i.e., supplying a controlled amount of urea. The stored ammonia reacts with the NOx emissions on the catalyst surface to produce nitrogen, i.e. $N_2$.

There is a need to effectively control urea injection in a powertrain system so equipped.

SUMMARY OF THE INVENTION

In accordance with an embodiment of the invention, an exhaust aftertreatment system for an internal combustion engine includes a urea injecting device, a selective catalyst reduction device, and, a sensing device operative to monitor a forward portion of the selective catalyst reduction device. The sensing device can include a NOx sensor, and alternatively, an ammonia sensor.

In accordance with an embodiment of the invention, an exhaust aftertreatment control system for an internal combustion engine includes an exhaust aftertreatment system having a NOx sensing device, a urea injecting device, a temperature sensing device, a selective catalyst reduction device, and a sensing device operative to monitor a forward portion of the selective catalyst reduction device. The system may also include a control module adapted to monitor signal inputs from the engine, the NOx sensing device, the temperature sensing device, and the sensing device operative to monitor a forward portion of the selective catalyst reduction device.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF EMBODIMENTS OF THE INVENTION

Figure 1:
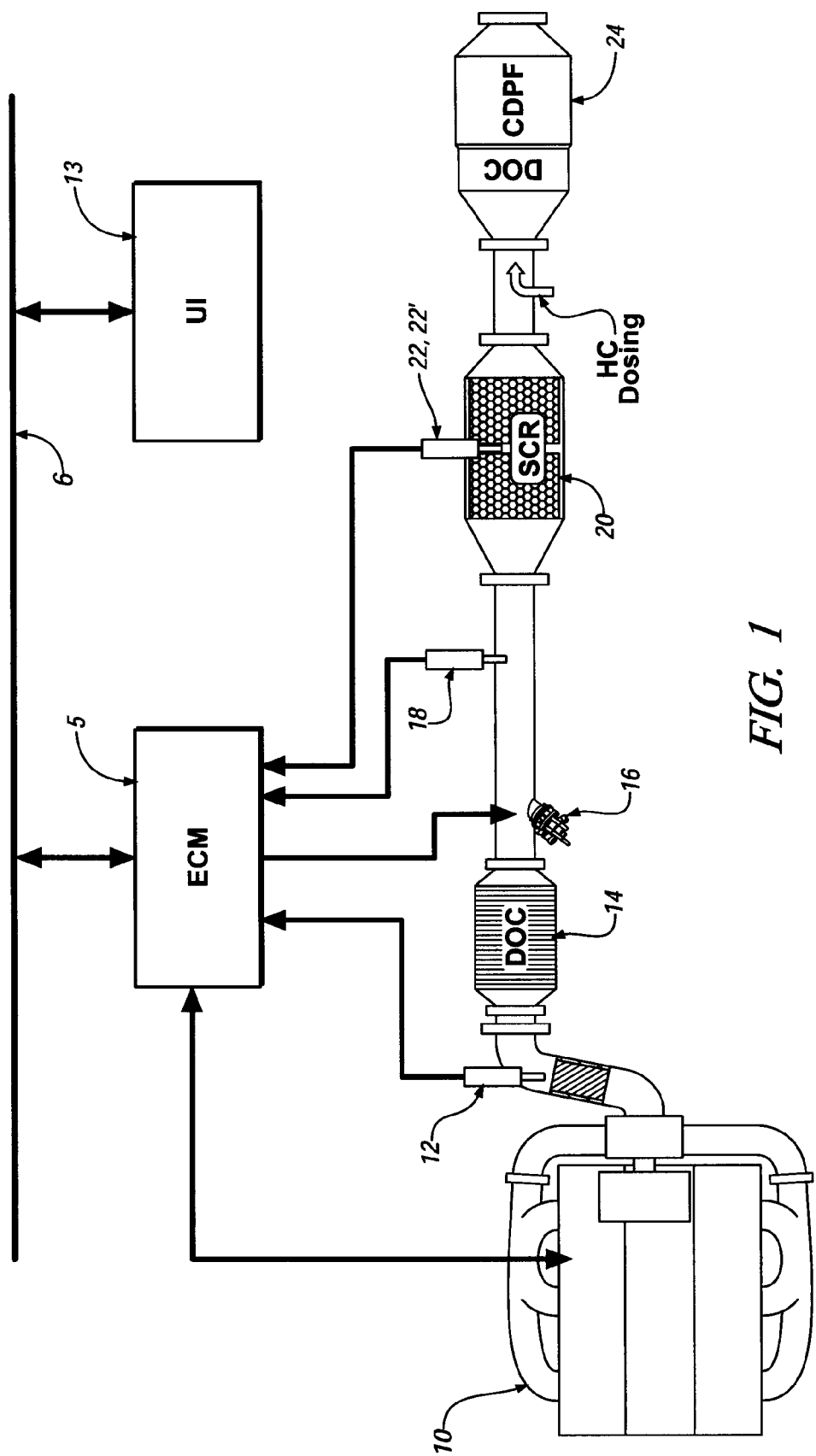
FIG. 1 is a schematic diagram of a powertrain system, in accordance with the present invention.

Referring now to the drawings, wherein the showings are for the purpose of illustrating the invention only and not for the purpose of limiting the same, FIG. 1 shows a schematic diagram of an internal combustion engine, exhaust aftertreatment system, and control system which has been constructed in accordance with an embodiment of the present invention.

The exemplary engine and control system comprises a four-cycle internal combustion engine 10 and electronic engine control module ('ECM') 5. The exemplary engine comprises a diesel compression-ignition engine having an operating regime that is primarily lean of stoichiometry. Alternatively, the engine may comprise an engine using any one of a number of engine control strategies which operate lean of stoichiometry, e.g. homogeneous-charge compression-ignition engines, and lean-burn spark-ignition engines. The exemplary engine 10 includes a plurality of reciprocating pistons attached to a crankshaft, which is operably attached to a vehicle driveline to deliver tractive torque to the driveline. The engine generates an exhaust gas feedstream containing regulated constituent elements to be transformed by the aftertreatment system, typically including hydrocarbons ('HC'), carbon monoxide ('CO'), nitrides of oxygen ('NOx'), and particulate matter ('PM'), among others.

The exhaust aftertreatment system comprises an integrated system intended to convert the constituent elements of the exhaust gas feedstream to harmless gases. An exhaust manifold entrains and directs exhaust gas flow to the exhaust aftertreatment system. The exemplary aftertreatment system includes devices comprising an oxidation catalyst 14, a selective catalyst reduction ('SCR') catalyst 20, and a final catalyst 24 comprising a second oxidation catalyst combined with a diesel particulate filter ('DPF'). The SCR catalyst 20 is adapted to permit intermediate placement of an exhaust gas sensing device 22, 22' within the SCR catalyst device, enabling the exhaust gas sensing device 22, 22' to monitor exhaust gases after having passed through a front or forward portion of the SCR catalyst, and before having passed through the entire SCR catalyst device. Such monitoring can be accomplished, for example, when the SCR catalyst 20 comprises a catalyst system wherein there are two or more catalyst substrates assembled within a single SCR assembly and the sensing device, or a gas sampling device, is effective to monitor gas between the two substrates. Determining an effective portion of the catalyst to be monitored can be based upon urea-storage capacity of a specific catalyst formulation, including, e.g. concentrations and masses and surface areas of catalytic metals and washcoat materials. Selective placement of the sensing device 22, 22' within the SCR catalyst is determined based upon desired application-specific operating and control characteristics. For example, placement of the sensing device to monitor a front third of the SCR catalyst permits transient control with a relatively short lag time for response. Alternatively, placement of the sensing device to monitor a front two-thirds of the SCR catalyst permits utilization of a SCR catalyst having lower urea storage capacity.

Each of the exhaust aftertreatment devices comprise a device which employs technologies having various capabilities for treating the constituent elements of the exhaust gas feedstream, including oxidation, selective catalyst reduction, HC dosing, and particulate filtering. The devices are preferably fluidly connected in series using known pipes and connectors.

The aftertreatment system includes sensing devices and systems preferably signally connected to the ECM 5. The sensing devices include a NOx sensor 12 operative to sense exhaust gases exiting the engine, a temperature sensor 18 operative to measure temperature of exhaust gases from which temperature of the SCR catalyst 20 is determined, and exhaust gas sensing device 22, 22' which is a second sensor operative to monitor constituent elements of exhaust gases within the SCR catalyst 20, after having passed through a portion thereof. The exhaust gas sensing device can comprise a NOx sensor 22, operative to generate an electrical signal correlatable to a parametric value for NOx concentration in the exhaust gas feedstream. Alternatively, the exhaust gas sensing device can comprise an ammonia ('$NH_3$') sensor 22', operative to generate an electrical signal correlatable to a parametric value for $NH_3$ concentration in the exhaust gas feedstream.

The exhaust aftertreatment system includes a urea injection system, including a refillable urea storage tank (not shown) fluidly connected to a urea dosing module 16. The urea dosing module 16 comprises a solenoid-controlled fluid valve that has a fluid outlet adapted to inject urea into an exhaust pipe downstream of the oxidation catalyst 14, preferably upstream of the temperature sensor 18 and the SCR catalyst 20. The urea dosing module 16 is operably connected to the control system through ECM 5. The ECM 5 is adapted to control timing and quantity of urea injection into the exhaust gas feedstream. Details of the urea injection are described hereinafter.

The exhaust aftertreatment system may include a hydrocarbon ('HC') dosing device for injecting a controlled amount of HC upstream of the diesel particulate filter ('DPF') after the second oxidation catalyst. The HC dosing device is operably connected to the ECM 5, which is adapted to control timing and quantity of HC injection, typically in the form of vehicle fuel, to the exhaust gas feedstream.

The control system is preferably a distributed control module architecture comprising a plurality of control modules adapted to provide coordinated control of the various vehicle systems including the powertrain system described herein. The control system is operable to monitor inputs from sensing devices, synthesize pertinent information, and execute algorithms to control various actuators to achieve control targets, including such parameters as fuel economy, emissions, performance, driveability, and protection of hardware. The distributed controller architecture includes ECM 5, and User Interface ('UI') 13 which is operably connected to a plurality of other devices through which a vehicle operator typically controls or directs operation of the vehicle and powertrain. Exemplary devices through which a vehicle operator provides input to the UI 13 include an accelerator pedal, a brake pedal, transmission gear selector, and, vehicle speed cruise control. Each of the aforementioned controllers and devices communicate with other controllers, devices, sensors, and actuators via a high-speed local area network ('LAN') bus, shown generally as item 6. The LAN bus 6 allows for structured communication of control parameters and commands between the various processors, control modules, and devices. The specific communication protocol utilized is application-specific. The LAN bus and appropriate protocols provide for robust messaging and multi-controller interfacing between the aforementioned controllers, and other controllers providing functionality such as antilock brakes, traction control, and vehicle stability.

The ECM 5 comprises a central processing unit signally electrically connected to volatile and non-volatile memory devices via data buses. The ECM 5 is operably attached to sensing devices and other output devices to ongoingly monitor and control operation of the engine 10 and exhaust system, as shown. The output devices preferably include subsystems necessary for proper control and operation of the engine, including, by way of example, an air intake system, a fuel injection system, a spark-ignition system (when a spark-ignition engine is used), an exhaust gas recirculation system, and an evaporative control system. The engine sensing devices include devices operable to monitor engine operation, external conditions, and operator demand, and are typically signally attached to the ECM 5 via wiring harnesses.

Algorithms stored in the non-volatile memory devices are executed by the central processing unit and are operable to monitor inputs from the sensing devices and execute engine control and diagnostic routines to control operation of the engine, using preset calibrations. Algorithms are typically executed during preset loop cycles, with each control algorithm executed at least once each loop cycle. Loop cycles are typically executed each 3.125, 6.25, 12.5, 25 and 100 milliseconds during engine operation. Alternatively, control algorithms may be executed in response to occurrence of an event. A cyclical event, e.g. calculation of engine fueling, may be executed each engine cycle. A diagnostic algorithm may be executed once per engine key-on cycle. A diagnostic algorithm may have further limitations including requirements for achieving specific enablement criteria before execution. Use of the ECM 5 to control and diagnose operation of various aspects of the internal combustion engine 10 is well known to one skilled in the art.

Figure 2:
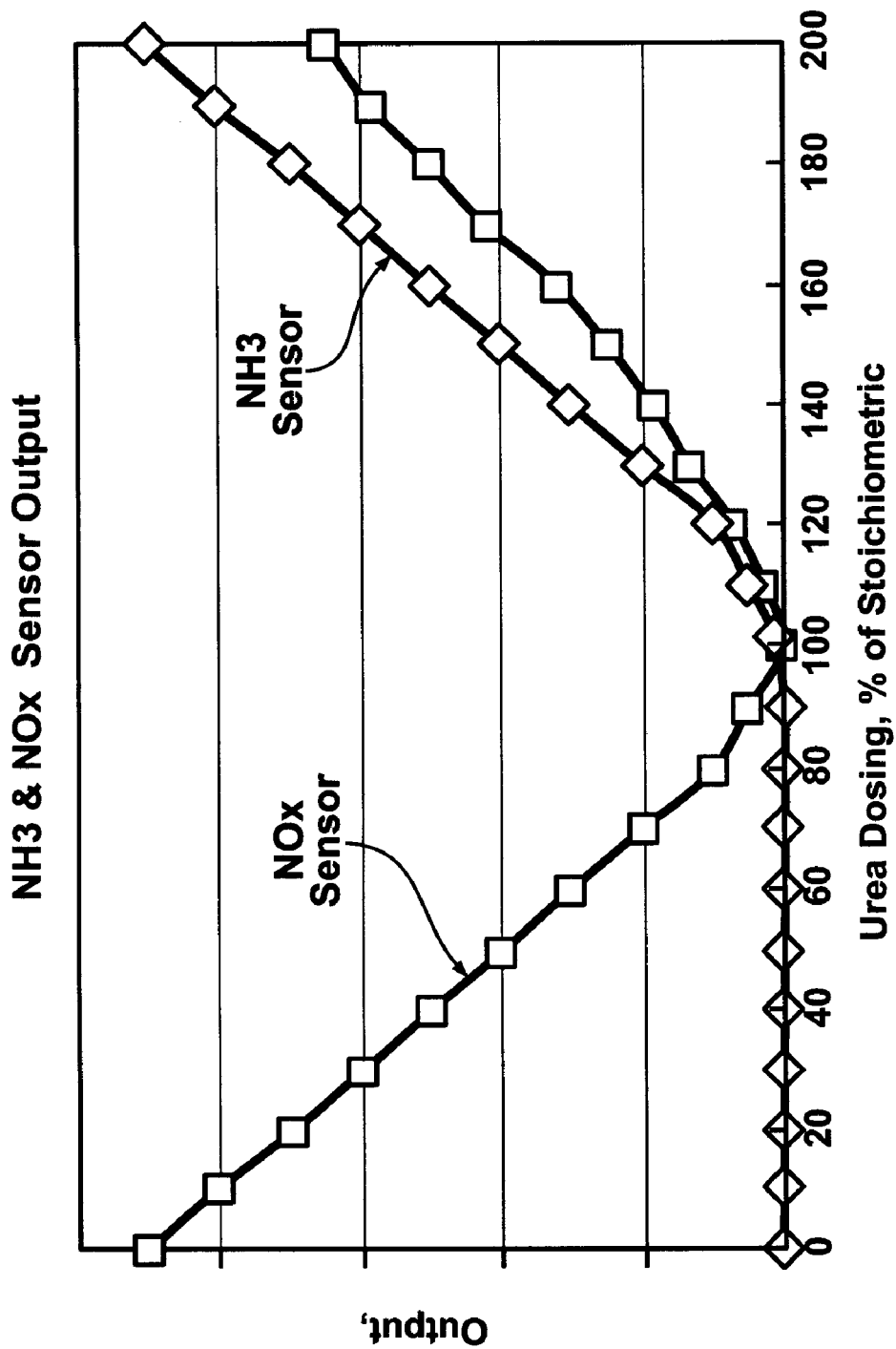
FIG. 2 is a datagraph, in accordance with the present invention.

Referring now to FIG. 2, exemplary output signals for the exhaust gas sensing device 22, 22' referenced in FIG. 1 are shown. The sensing device can comprise a NOx sensor 22, operative to generate an electrical signal correlatable to a parametric value for NOx concentration in the exhaust gas feedstream. Alternatively, the exhaust gas sensing device can comprise an ammonia ('$NH_3$') sensor 22', operative to generate an electrical signal correlatable to a parametric value for $NH_3$ concentration in the exhaust gas feedstream. The x-axis comprises a reading of urea dosing, shown as a percent of a urea/NOx stoichiometric ratio, wherein a ratio of 100% comprises a balanced relationship between mass of urea and mass of NOx. When the urea/NOx stoichiometric ratio is greater than 100%, it is indicative of a mixture rich in urea, which is reflected in an output from the $NH_3$ sensor 22' and the NOx sensor 22 greater than zero. When the urea/NOx stoichiometric ratio is less than 100%, it is indicative of a mixture lean in urea, which is reflected in an output from the NOx sensor 22 greater than zero, and an output from the $NH_3$ sensor 22' that is substantially zero.

Figure 3:
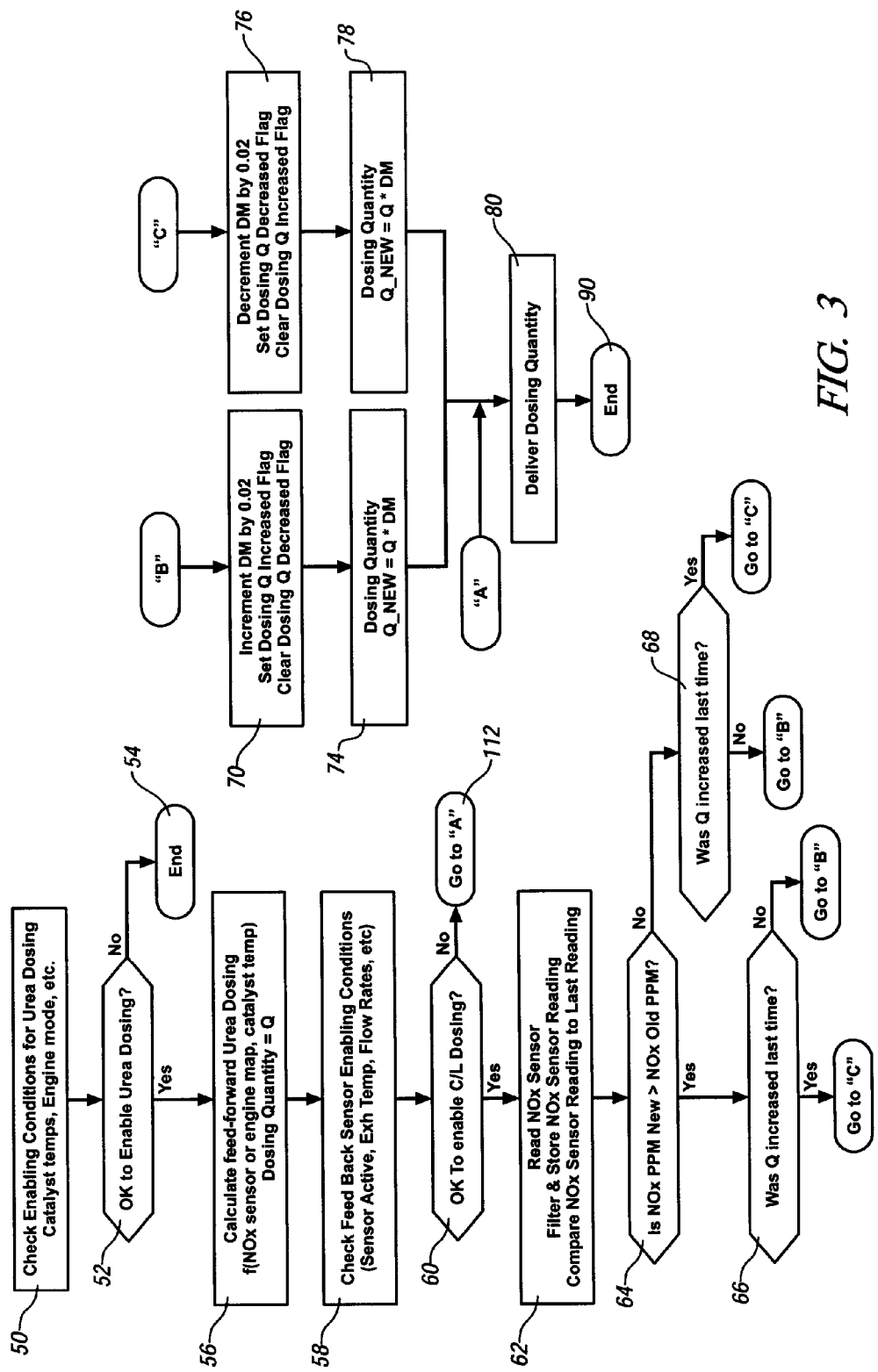
FIGS. 3 and 4 are algorithmic flowcharts, in accordance with the present invention.

Referring now to FIG. 3, a flowchart for an algorithm comprising a control scheme executed to control the system described with reference to FIG. 1 is described. The algorithm is preferably cyclically executed in ECM 5 during a loop cycle to control operation of the engine and exhaust aftertreatment system described hereinabove, wherein the second sensor comprises the NOx sensor 22 operative to monitor exhaust gases and generate an electrical signal correlatable to a parametric value for NOx concentration in the exhaust gas feedstream within the SCR catalyst 20, after having passed through a portion thereof. Enabling conditions for urea dosing are monitored, including catalyst temperature and engine operating modes (Block 50). When conditions are appropriate to enable dosing (Block 52), a feed-forward dosing quantity, Q, is determined based upon an output signal from NOx sensor 12 placed upstream of the urea dosing module 16 or based upon an engine speed/load operating point and catalyst operating temperature, preferably measured with sensor 18 (Block 56). Otherwise, the algorithm ends (Block 54) and monitoring continues on a subsequent cyclic execution of the algorithm. After the feed-forward dosing quantity, Q, is determined, it is determined whether conditions for closed loop monitoring and control using signal from the feedback NOx sensor 22 have been met (Block 58), such conditions preferably include monitoring to ensure the sensor 22 is active, and the exhaust gas temperature is within an allowable range, engine flow rate is within an allowable range, and other conditions. When the monitoring conditions are not met (Block 60), the control system controls operation of the urea dosing module 16 to inject the dosing quantity, comprising a requisite mass of urea, Q, determined by the feed-forward control scheme (Block 80), and the operation ends for the cycle (Block 90).

When the monitoring conditions are met (Block 60), closed loop dosing control is enabled, which is described hereinbelow. A signal output from the NOx sensor 22 is read by the control module, filtered, and stored in memory of the control module, and compared to a previous reading from the sensor 22 (Block 62). When magnitude of the currently read signal from the NOx sensor is less than the previously read signal from the NOx sensor (Block 64), the control system determines whether the dosing quantity, Q, was increased during the previous cycle (Block 68). When dosing quantity was previously increased, a dosing multiplier, DM, preferably having an initial value of 1.00 prior to any closed-loop control, is decremented by a value (shown herein as 0.02), a dosing-quantity-decreased flag is set, and a dosing-quantity-increased flag is cleared (Block 76). When dosing was not increased during the previous cycle, the dosing multiplier is incremented by a value, (shown herein as 0.02), the dosing-quantity-increased flag is set and the dosing-quantity-decreased flag is cleared (Block 70).

When magnitude of the currently read signal from the NOx sensor is greater than or equal to the previously read signal from the NOx sensor (Block 64), the control system again determines whether the dosing quantity, Q, was increased during the previous cycle (Block 66). When the dosing quantity was increased during the previous cycle, the dosing multiplier is decremented by a value (shown herein as 0.02), the dosing-quantity-decreased flag is set, and the dosing-quantity-increased flag is cleared (Block 76). When dosing quantity was not increased during the previous cycle (Block 66), the dosing multiplier is incremented by a value (shown herein as 0.02), the dosing-quantity-increased flag is set and the dosing-quantity-decreased flag is cleared (Block 72).

The control system determines a new dosing quantity, Q_new, comprising the dosing quantity multiplied by the Dosing multiplier, DM (Blocks 74 or 78), and the ECM 5 controls operation of the urea dosing module 16 to inject the dosing quantity, comprising a requisite mass of urea, Q_new (Block 80), and the operation ends for the cycle (Block 90).

Figure 4:
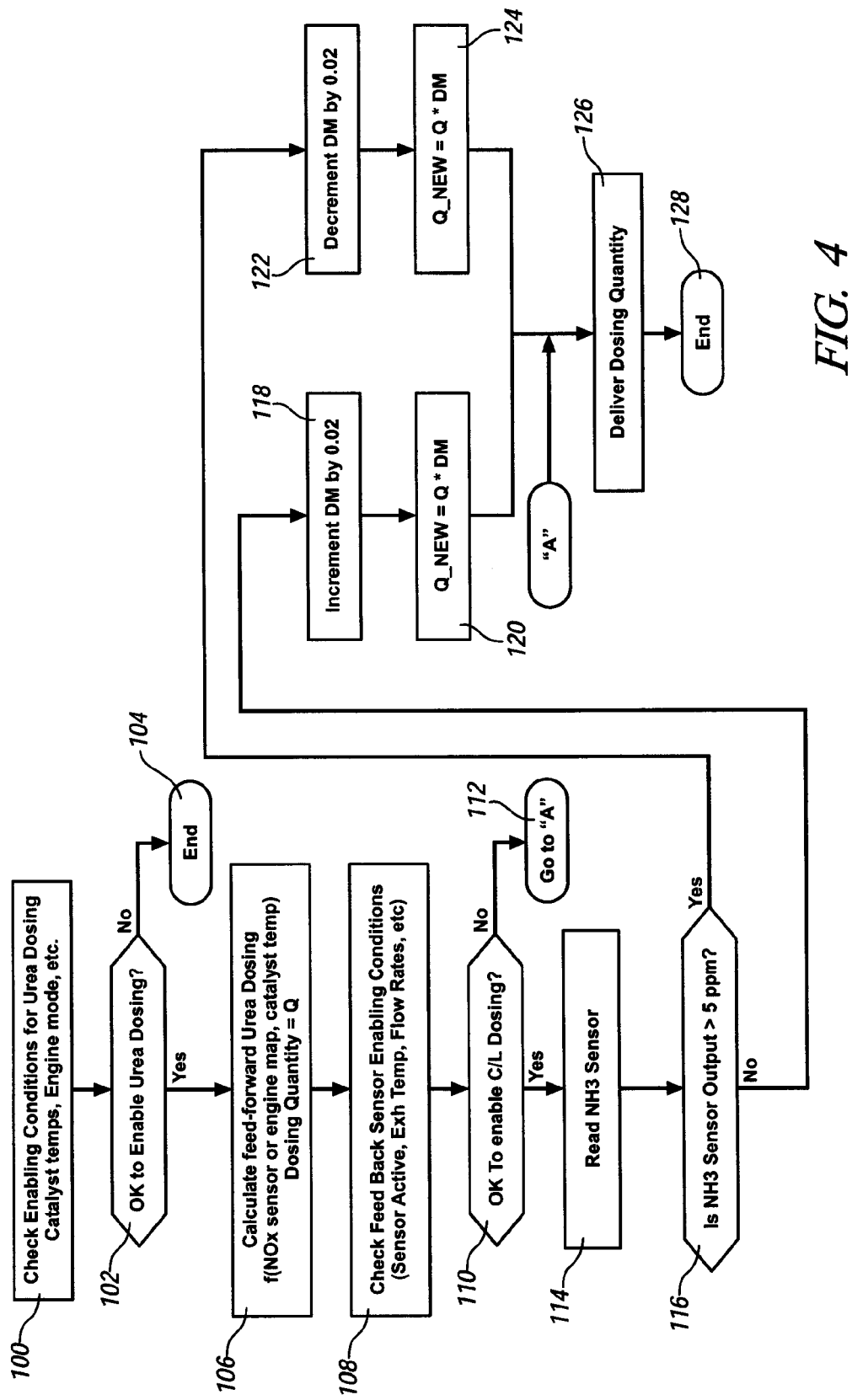

Referring now to FIG. 4, a flowchart for a second algorithm comprising a control scheme executed to control the system described with reference to FIG. 1 is described. The algorithm is preferably cyclically executed in ECM 5 during a loop cycle to control operation of the engine and exhaust aftertreatment system described hereinabove, wherein the second sensor comprises the $NH_3$ sensor 22' operative to monitor exhaust gases and generate an electrical signal correlatable to a parametric value for $NH_3$ concentration in the exhaust gas feedstream within the SCR catalyst 20, after having passed through a portion thereof. Enabling conditions for urea dosing are monitored, including catalyst temperature and engine operating modes (Block 100). When conditions are appropriate to enable dosing (Block 102), a feed-forward dosing quantity, Q, is determined based upon an output signal from the NOx sensor 12 placed upstream of the urea dosing module 16 or based upon engine speed/load operating conditions (Block 106). Otherwise, the algorithm ends (Block 104) and monitoring continues during subsequent cyclic execution of the algorithm. After the feed-forward dosing quantity, Q, is determined, it is determined whether conditions for closed loop monitoring and control using output from the feedback $NH_3$ sensor 22' have been met (Block 108), such conditions preferably include monitoring to ensure the sensor 22' is active, the exhaust gas temperature is within an allowable range, engine flow rate is within a range, and other conditions. When the monitoring conditions are not met (Block 110), the ECM 5 controls operation of the urea dosing module 16 to inject the dosing quantity, comprising a requisite mass of urea, Q, determined by the feed-forward control scheme (Block 126), and the operation ends for the cycle (Block 128).

When closed-loop monitoring and dosing control is enabled (Block 110), signal output from the $NH_3$ sensor 22' is read by the control module, and preferably transformed into a reading of $NH_3$ concentration in parts per million ('ppm') (Block 114). When the sensor signal is greater than a threshold, shown herein as 5 ppm (Block 116), the dosing multiplier, DM, is decremented by a factor, shown herein as 0.02 (Block 122), and a new dosing quantity, Q_new, is determined by multiplying the dosing quantity, Q, by the dosing multiplier. When the sensor signal is less than the threshold (Block 116), the dosing multiplier is incremented by a factor, shown herein as 0.02 (Block 118), and a new dosing quantity, Q_new, is determined by multiplying the dosing quantity, Q, by the dosing multiplier. The ECM 5 controls operation of the urea dosing module 16 to inject the dosing quantity, comprising the requisite mass of urea, in this case Q_new into the exhaust system (Block 126) and the operation ends for the cycle (Block 128).

Regardless of the feedback sensor used, i.e. the NOx sensor 22 or the urea sensor 22', the control system can be adapted to control urea injection to a urea/NOx stoichiometry point, using the closed-loop control of urea dosing and signal information from the sensor.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. An exhaust gas aftertreatment control system for an internal combustion engine operable lean of stoichiometry, comprising:

an exhaust aftertreatment system including a sensing device operative to monitor temperature and concentration of NOx gases in an exhaust gas feedstream upstream of a the selective catalyst reduction device, a urea injecting device, a selective catalyst reduction device located downstream of the urea injecting device, the selective catalyst reduction device including upstream and downstream portions relative to exhaust gas flow; and a sensing device operative to monitor only the upstream portion of the selective catalyst reduction device; and, a control module adapted to monitor signal inputs from the engine, the sensing device operative to monitor temperature and concentration of NOx gases in the exhaust gas feedstream upstream of the selective catalyst reduction device, and the sensing device operative to monitor only the upstream portion of the selective catalyst reduction device, said control module controlling operation of the urea injecting device based on selected ones of the monitored signal inputs and including:

injecting a dosing quantity of urea determined based upon the temperature and concentration of NOx gases in the exhaust gas feedstream upstream of the selective catalyst reduction device, monitoring a constituent of the exhaust gas feedstream having passed through only the upstream portion of the selective catalyst reduction device, and adjusting the dosing quantity of urea based upon feedback from the monitored constituent of the exhaust gas feedstream having passed through only the upstream portion of the selective catalyst reduction device.

2. The exhaust aftertreatment control system of claim 1, wherein adjusting the dosing quantity of urea comprises adjusting urea to a urea/NOx stoichiometry point.

3. The exhaust aftertreatment control system of claim 1, wherein the sensing device operative to monitor only the upstream portion of the selective catalyst reduction device comprises an ammonia sensor.

4. The exhaust aftertreatment control system of claim 3, wherein the control module controlling operation of the urea injecting device further includes adjusting the determined mass of urea for injection based upon input from the ammonia sensor.

5. The exhaust aftertreatment control system of claim 3, wherein adjusting the dosing quantity of urea comprises adjusting urea to a urea/NOx stoichiometry point.

6. The exhaust aftertreatment control system of claim 1, wherein the sensing device operative to monitor only the upstream portion of the selective catalyst reduction device comprises a NOx sensor.

7. The exhaust aftertreatment control system of claim 6, wherein adjusting the dosing quantity of urea comprises adjusting urea to a urea/NOx stoichiometry point.

8. A method to operate an exhaust gas aftertreatment system equipped with a urea injecting device and a selective-catalyst-reduction device, comprising:

monitoring temperature and concentration of NOx gases in an exhaust gas feedstream upstream of the selective catalyst reduction device;

injecting a dosing quantity of urea determined based upon the temperature and concentration of NOx gases in the exhaust gas feedstream upstream of the selective catalyst reduction device;

monitoring a constituent of the exhaust gas feedstream having passed through only a forward portion of the selective catalyst reduction device; and, adjusting the dosing quantity of urea based upon feedback from the monitored constituent of the exhaust gas feedstream having passed through only the forward portion of the selective catalyst reduction device.

9. The method of claim 8 wherein monitoring a constituent of the exhaust gas feedstream having passed through only a forward portion of the selective catalyst reduction device comprises monitoring a concentration of ammonia gas.

10. The method of claim 8 wherein monitoring a constituent of an exhaust gas feedstream having passed through only a forward portion of the selective catalyst reduction device comprises monitoring a concentration of NOx gas.

11. The method of claim 8 wherein controlling operation of the urea injecting device further comprises controlling to a urea/NOx stoichiometry point.

* * * * *